Aug. 14, 1928.

Re. 17,067

J. VER MEHR

MIXING MACHINE

Original Filed May 12, 1923 3 Sheets-Sheet 1

INVENTOR
John ver Mehr
BY
Langner, Parry, Card & Langner
ATTS.

Aug. 14, 1928.

Re. 17,067

J. VER MEHR

MIXING MACHINE

Original Filed May 12, 1923 3 Sheets-Sheet 2

INVENTOR
John ver Mehr
BY
Kenyon, Perry, Card & Kenyon
ATTS

Aug. 14, 1928.

J. VER MEHR

Re. 17,067

MIXING MACHINE

Original Filed May 12, 1923 3 Sheets-Sheet 3

INVENTOR
John ver Mehr
BY
Langner, Parry, Card & Langner
ATTS.

Reissued Aug. 14, 1928.

Re. 17,067

UNITED STATES PATENT OFFICE.

JOHN VER MEHR, OF LONDON, ENGLAND.

MIXING MACHINE.

Original No. 1,583,892, dated May 11, 1926, Serial No. 638,533, filed May 12, 1923. Application for reissue filed December 28, 1927. Serial No. 243,109.

This invention has reference to mixing machines whereby various ingredients or substances may be intimately admixed or commingled.

More particularly the invention is concerned with machines for mixing concrete or the like although it is to be understood that its sphere of usefulness is not to be considered as restricted to this specific purpose as apparatus according to my invention may be employed generally where it is desired to produce a thorough admixture of various ingredients or substances.

It has been found desirable in order to produce uniform mixtures expeditiously however that the constituent parts of the material should be fed into the drum in batches of gauged proportions and that the drum should be such as to be capable of effectively mixing several of such batches at the same time in separated relation.

Accordingly the present invention consists in a mixing machine wherein the substances or ingredients to be mixed are fed in batches to a rotatable mixing drum by a combined elevating and automatic gauging device whereby the correct proportions of the several substances are introduced into the drum which is provided with a plurality of chambers or compartments through which the substances to be mixed are caused to pass in a plurality of separated batches and in each of which the batches are mixed for example by means of blades or baffles mounted therein a batch of completely mixed material being discharged at each complete revolution of the drum.

The improved mixing machine includes in its embodiment as elevator device comprising belts or chains provided with buckets which are adapted during operation of the apparatus to pick up material from a hopper and convey it to the elevated end of an inclined mixing drum. The hopper is divided into an appropriate number of compartments one for each of the several substances to be mixed and means are provided for levelling the material in each bucket as it emerges from the hopper so that an approximately predetermined quantity of material is extracted from the hopper by each bucket. The buckets are so arranged that the contents are introduced—such as by the aid of an appropriate chute or hopper—into the mixing drum proper which consists of a preferably cylindrical shell or drum revolvably mounted about an inclined axis and having a plurality of compartments communicating with each other each of said compartments having one or more mixing blades or baffles whereby the substances are lifted and turned over as the drum rotates and transferred to the next following compartment by the combined action of gravity and the aforesaid blades or baffles the contents of the final compartment of the drum being discharged at each complete revolution of the drum. The mixing drum is revolvably mounted at such an inclination as to ensure that substances introduced at one end will travel by the combined action of gravity and the aforesaid blades or baffles toward and be discharged from the opposite end of the drum as this latter is rotated.

The aforesaid drum is divided into a plurality of compartments by transverse partitions having a portion or portions cut away whereby material under treatment may pass from one compartment to the other the opening or openings in adjacent partitions preferably being staggered relatively to each other that is to say the opening in one partition is opposed diametrically to the opening in the adjacent partition.

The interior of each of the aforesaid compartments is provided with a lifting blade or blades preferably extending parallel with the axis of rotation of the drum although they may be arranged in angular direction relatively thereto.

A suitable framing is provided adapted to support the aforesaid elevator and the mixing drum which latter may be mounted by means of trunnions or by means of a spindle passing through the drum and suitable mechanism is provided for rotating said drum and actuating the elevator.

In order that the invention may be clearly understood reference will now be had to the accompanying drawings wherein a preferred embodiment of the invention is illustrated by way of example.

Referring to the drawings wherein the same reference letters indicate the same or similar parts, *b* represents a frame on which the apparatus is mounted said frame being supported on wheels *c*.

Mounted on the frame *b* near one end thereof is a trunk or casing *d* within which are supported the guide rails *e* serving to guide an endless conveyor or elevator *f* to which the buckets *g* are attached. The elevator is operated by a gear *h* mounted on a spindle *i* driven by a chain belt or the like *j* from a spindle *k* the latter being driven by a belt or other transmission from an engine *l* carried by the frame *b*.

Figure 4:
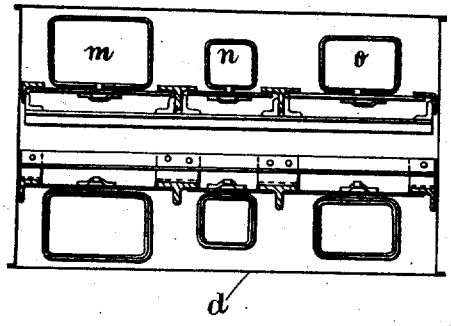
Fig. 4 is a section through the elevating device.
Figure 5:
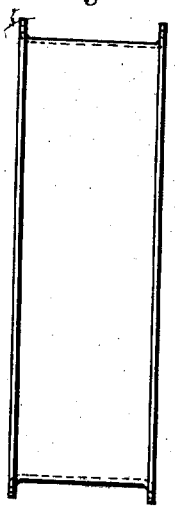
Fig. 5 illustrates one of the drum sections.
Figure 6:
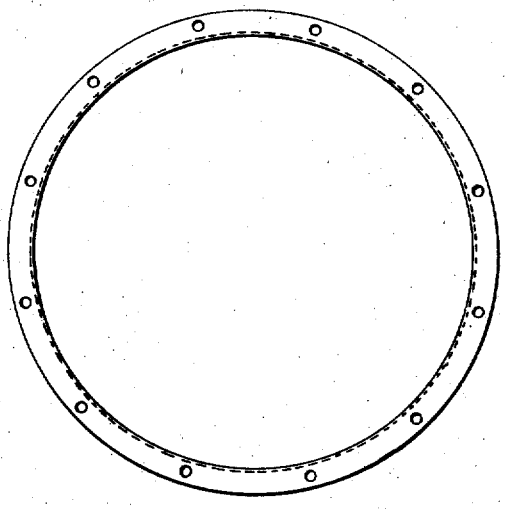
Fig. 6 is an end view thereof.
Figure 7:
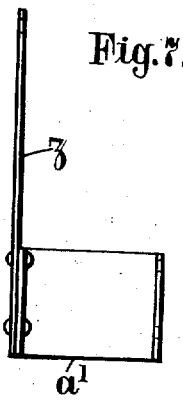
Fig. 7 is a side view of a division plate.
Figure 8:
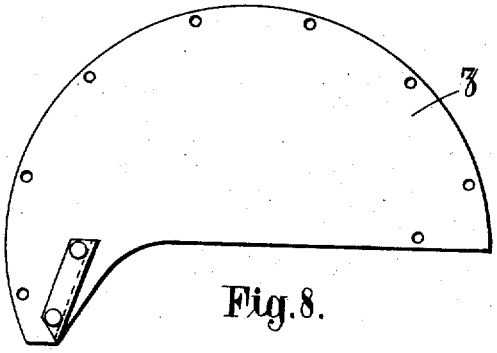
Fig. 8 is a front view thereof.

The buckets *g* are arranged in series or sets on the elevator *f* and each set in the present embodiment and as applied to a concrete mixer comprises three buckets *m*, *n* and *o* Fig. 4 the bucket *m* being adapted to convey ballast to the mixing drum the bucket *n* cement and the bucket *o* sand.

A hopper *p'* is supported on the frame *b* at the bottom of the elevator trunk or casing *d* and is provided with three compartments *p*, *q*, *r* to which ballast cement and sand are fed respectively. The hopper *p'* is preferably capable of being easily detached from the frame *b*.

The buckets *m*, *n*, *o* when the elevator *f* is operated to pass through the compartments in the hopper and become filled with the respective ingredients and in order to remove the superflous material from said buckets scrapers *s* are provided said scrapers being carried on arms *t* mounted on a spindle *u* carried by the hopper *p'*. The buckets when passing through the compartments in the casing come into contact with the scraping device which removes the surplus material from the buckets whereby as they emerge from the casing they will each contain a predetermined quantity of material which is then discharged as the buckets are elevated into a chute *v* and are thus introduced into the mixing drum *w*.

The mixing drum *w* is revolvably mounted on the frame *b* and at one end thereof is an annular gear *x* which meshes with a pinion *y* mounted on the shaft *k*. The drum is divided into a plurality of compartments by transverse partitions *z* and it will be seen from Figure 1 that each partition has a portion cut away whereby the material under treatment can pass from one compartment to the other. The openings in adjacent partitions are opposed that is to say the opening in one partition is diametrically opposed to the opening in the adjacent partition.

Figure 3:
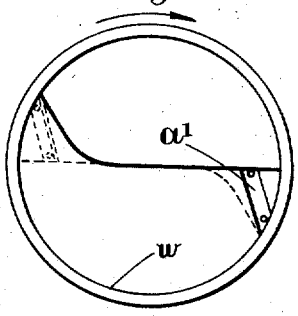
Fig. 3 is a section on the line *a—a*, Fig. 1 drawn to a larger scale.

The interior of each compartment is provided with a lifting blade *a'* Fig. 3 which extends parallel with the axis of the drum.

Figure 1:
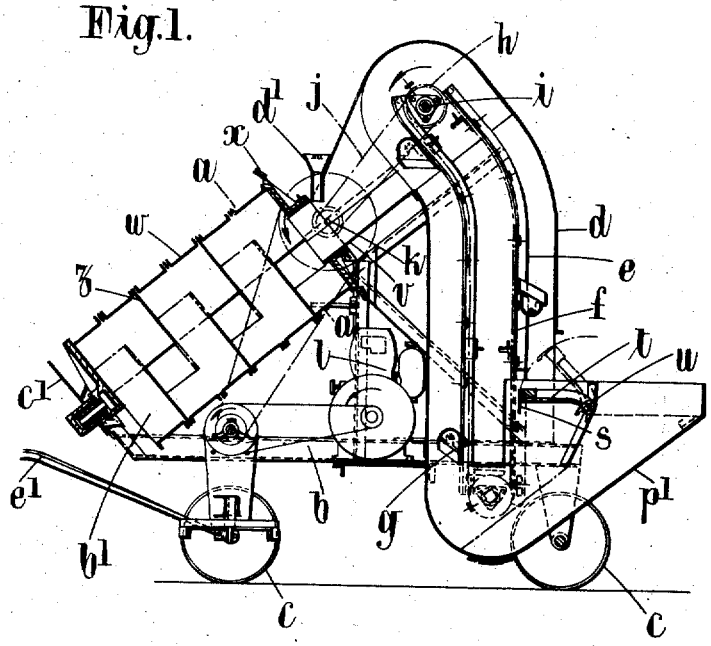
Fig. 1 is an elevation of one form of apparatus.
Figure 2:
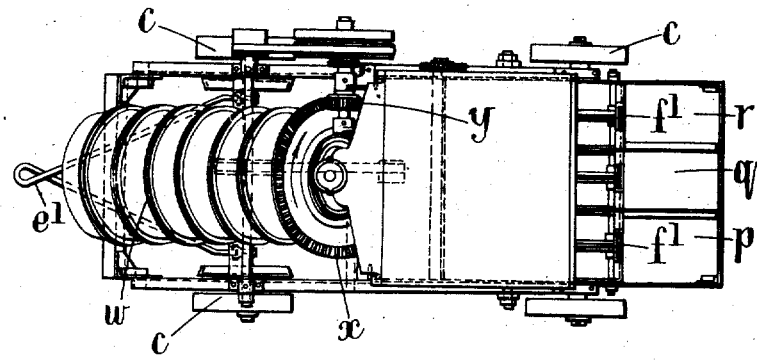
Fig. 2 is a plan view thereof.

As shown in Fig. 1 the drum is built up of a number of sections each of which comprises a cylindrical shell having flanges whereby it may be bolted or otherwise secured to other similar sections one end of each section being provided with the aforementioned partition while the other end is open the interior of each section having mounted therein the lifting blades *a'* so that by securing a number of such sections together a drum containing any desired number of chambers or compartments may be constructed. Such a construction facilitates manufacture and repairs and renewals of the parts within the drum may readily be effected.

One end of the drum has a discharge opening *b'* through which the concrete is intermittently discharged and a splash guard *c'* is arranged at the end of the drum.

Water is introduced in predetermined quantities through a funnel *d'* supported on the chute *v*. The water may be sprayed on to the materials or it may be introduced into the chute *v* in any other convenient manner.

A drawbar *e'* is provided to facilitate transport of the apparatus from one place to another and if desired the frame *b* may be supported on endless chain tracks.

If it is desired to change the proportions of the various ingredients this can easily be effected by removing the buckets from the elevator and substituting buckets of such sizes as to give the proportions desired or the buckets may be provided with movable partitions which can be adjusted as and when desired.

The compartments in the hopper may be provided with means such as name plates *f'* for indicating the contents thereof.

In operating a mixing machine constructed in accordance with this invention the several substances to be mixed are fed into the separate compartments of the elevator hopper in bulk and after the machine has been started the operation is automatic in the sense that the elevator picks up a predetermined quantity of each of the ingredients and introduces them at the elevated end of the mixing drum where they are mixed in the first compartment thereof. As this drum is rotated the contents pass to the second compartment of the drum where they are submitted to a further mixing and while this is occurring a fresh charge is introduced to the drum by the elevator. It will be seen that the materials are mixed in batches each complete batch travelling through the compartments of the drum until it is ejected at the discharge end thereof. By this means the gauged proportions of the several ingredients are accurately maintained throughout the whole of the mixing operation.

What I claim is:—

1. A mixing machine comprising in combination a rotatable mixing drum, partitions dividing said drum into a number of separate intercommunicating mixing compartments, means for feeding gauged batches of the several ingredients to be mixed into said drum at predetermined intervals, means whereby the contents of one mixing compartment of said drum pass into the next adjacent compartment during rotation of said drum at said predetermined intervals, and means whereby batches of completely mixed material are discharged from said drum at said predetermined intervals, whereby a plurality of gauged batches of said ingredients are mixed in said drum in separated relation at the same time.

2. A mixing machine comprising in combination a rotatable mixing drum, partitions dividing said drum into a number of separate intercommunicating mixing compartments, means for feeding gauged batches of the several ingredients to be mixed into said drum at each complete revolution thereof, means whereby the contents of one compartment pass into the next adjacent compartment at each complete revolution of said drum and means whereby a batch of completely mixed material is discharged at each complete revolution of said drum whereby a plurality of gauged batches of ingredients are passed through said drum and mixed in separated relation at the same time.

3. A mixing machine comprising in combination a rotatable mixing drum, partitions dividing said drum into a plurality of intercommunicating mixing compartments, a combined elevating and automatic gauging device for feeding batches of the several ingredients of the desired mixture in gauged proportions into said drum at predetermined intervals, means whereby the contents of one compartment of said drum pass into the next adjacent compartment at said predetermined intervals during rotation of said drum, and means whereby batches of completely mixed material are discharged from the machine at predetermined intervals during rotation of said drum, whereby the said ingredients are mixed in said drum in a plurality of separated gauged batches.

4. A mixing machine comprising in combination an inclined rotatable mixing drum, partitions dividing said drum into a plurality of compartments, said partitions having each an opening which is staggered in relation to the opening in the next adjacent partition, a combined elevating and automatic gauging device for feeding batches of the several ingredients of the desired mixture in gauged proportions into said drum and means whereby batches of completely mixed material are discharged from the drum at predetermined intervals during revolution thereof, whereby said ingredients are passed through and mixed in said drum in a plurality of separated gauged batches.

5. A mixing machine as claimed in claim 3 in which a mixing blade is provided in each compartment.

6. A mixing machine comprising in combination an elevator device including belts provided with buckets, a hopper having a series of compartments each to contain one ingredient of the mixture, an inclined rotatable mixing drum having a series of transverse intercommunicating compartments, means for causing said buckets to pass through the compartments of said hopper and deliver batches of said ingredients in gauged proportions to said drum, means whereby the contents of one compartment pass to the next adjacent compartment during revolution of said drum, and means whereby batches of completely mixed material are delivered from said drum at predetermined intervals during revolution thereof, whereby a plurality of gauged batches of ingredients are passed through and mixed in said drum in separated relation at the same time.

7. A mixing machine comprising a rotatable mixing drum including a plurality of sections detachably connected together, partitions dividing said drum into a series of compartments, said partitions each having an opening therein which is staggered relatively to the opening in the next adjacent partition, an endless conveyor, separate batch groups of buckets thereon, a hopper, separate batch constituent compartments therein through which the buckets are arranged to pass, means for removing surplus material from said buckets, and means for causing said buckets to deliver a batch of ingredients to said drum at each revolution thereof whereby a plurality of gauged batches of ingredients are mixed in separated relation in said drum at the same time and means whereby a batch of completely mixed material is delivered from said drum at each complete revolution thereof.

In testimony whereof I have signed my name to this specification.

JOHN VER MEHR.